United States Patent [19]
Broer et al.

[11] Patent Number: 5,729,311
[45] Date of Patent: Mar. 17, 1998

[54] ILLUMINATION SYSTEM FOR A FLAT-PANEL PICTURE DISPLAY DEVICE

[75] Inventors: Dirk J. Broer, Eindhoven, Netherlands; Constance J. E. Seppen, Orléans, France; Henri M. J. Boots, Eindhoven, Netherlands

[73] Assignee: U.S. Philips Corporation, New York, N.Y.

[21] Appl. No.: 702,301

[22] Filed: Aug. 23, 1996

[30] Foreign Application Priority Data

Aug. 23, 1995 [EP] European Pat. Off. ............ 95202280

[51] Int. Cl.$^6$ .................... G02F 1/1335; F21V 9/14; F21V 7/04; G01D 11/28
[52] U.S. Cl. .................... 349/65; 349/57; 362/19; 362/26; 362/31
[58] Field of Search .................... 349/64, 65, 62, 349/57; 362/19, 26, 297, 298–302, 304, 305, 311, 346, 355, 31

[56] References Cited

U.S. PATENT DOCUMENTS

| | | | |
|---|---|---|---|
| 4,212,048 | 7/1980 | Castleberry | 362/19 |
| 4,985,809 | 1/1991 | Matsui | 362/31 |
| 5,339,179 | 8/1994 | Rudisill et al. | 349/65 |
| 5,349,503 | 9/1994 | Blonder et al. | 349/65 |
| 5,394,255 | 2/1995 | Yokota et al. | 349/65 |
| 5,396,350 | 3/1995 | Beeson et al. | 349/65 |
| 5,587,816 | 12/1996 | Gunjima et al. | 349/62 |

FOREIGN PATENT DOCUMENTS

| | | |
|---|---|---|
| 0213680 | 3/1987 | European Pat. Off. . |
| 0451905 | 10/1991 | European Pat. Off. . |
| 2-257188 | 10/1990 | Japan . |

*Primary Examiner*—Anita Pellman Gross
*Attorney, Agent, or Firm*—Jack D. Slobod

[57] ABSTRACT

An illumination system (3) includes an optical waveguide (11) and a light source (9) whose light is coupled into the optical waveguide (11) via at least one end face (13) of the optical waveguide (11). The optical waveguide (11) is provided with recesses (19) which are subsequently filled up with a material which is different from that of the optical waveguide (11). One of the two materials is isotropic and has refractive index $n_p$ and the other material is anisotropic and has refractive indices $n_o$ and $n_e$. For the refractive indices it should hold that $n_o$ or $n_e$ is equal or substantially equal to $n_p$ in order that there is separation of polarization at the interfaces between isotropic and anisotropic material. Further, a flat-panel picture display device includes such an illumination system.

17 Claims, 4 Drawing Sheets

ILLUMINATION SYSTEM FOR A FLAT-PANEL PICTURE DISPLAY DEVICE

BACKGROUND OF THE INVENTION

1. Field of the Invention

The invention relates to an illumination system comprising an optical waveguide of an optically transparent material having an exit surface and a plurality of end faces, opposite at least one of which a light source is situated, whose light can be coupled in at said end face of the optical waveguide, and polarizing means for polarizing the light emitted by the light source. The invention also relates to a flat-panel picture display device comprising such an illumination system.

2. Description of the Related Art

A flat-panel picture display device which is provided with an illumination system of the type described in the opening paragraph is known from U.S. Pat. No. 4,212,048. In the picture display device described in this patent, a picture display panel is illuminated by means of an illumination system which consists of a wedge-shaped transparent plate and a light source. The light rays emitted by the light source are coupled in at the end face of the optical waveguide and propagate through the waveguide because they undergo total internal reflection at the interface between optical waveguide and air. Since the angle of incidence of the light rays on the waveguide-air interface decreases upon each reflection, this angle will be smaller at a given instant than the critical angle and the relevant light rays will leave the optical waveguide. Moreover, the optical waveguide comprises polarizing means in the form of a strip of polarizing material which extends across the thickness of the optical waveguide in the vicinity of the light source. In this way, it is ensured that the light leaving the optical waveguide is polarized.

A drawback of the illumination system described in said U.S. Patent is that substantially 50% of the light supplied by the light source is lost without being able to contribute to the formation of the image, because the polarizer is dichroic and thus absorbs the unwanted direction of polarization. A further drawback is that the optical waveguide must be wedge-shaped in order that light can be coupled out at the exit surface of the optical waveguide. Due to the requirement of a sufficient light output, the freedom of design or the choice of the material for the optical waveguide is limited. In fact, a short time after the light is coupled into the optical waveguide, it reaches the polarizer and is thus polarized. This polarized light propagates through the optical waveguide until it is incident on the exit surface at an angle which is smaller than the critical angle for total internal reflection, and is consequently coupled out. Since, in practice, isotropic material is not perfectly isotropic, there will still be depolarization during propagation through the optical waveguide. Consequently, the output of polarized light having the same direction of polarization is reduced considerably. Either the distance which is covered before coupling out should therefore be relatively short, which limits the freedom of design of the optical waveguide, or the material of the optical waveguide should be very much isotropic, which limits the choice of the material.

SUMMARY OF THE INVENTION

It is an object of the present invention to provide an illumination system in which a relatively large pan of the light emitted by the light source is converted into light having the same direction of polarization before it leaves the optical waveguide, for which there is a wide choice of materials for use in the optical waveguide and in which the shape of the optical waveguide does not have a limiting effect on the light output, so that a greater freedom of design is possible.

To this end, the illumination system according to the invention is characterized in that the optical waveguide has a plurality of recesses comprising a material which is different from that of the optical waveguide, and in that the polarizing means are constituted by interfaces between the recesses and the optical waveguide, while the material of the optical waveguide or the material in the recesses is optically anisotropic and the other material is isotropic.

Due to linear polarization, an unpolarized beam falls apart in two mutually perpendicularly polarized beam components. Such a polarization separation may be obtained, for example, by causing an unpolarized beam to be incident on an interface between an area with an isotropic material having refractive index $n_p$ and an area with an anisotropic material having refractive indices $n_o$ and $n_e$, in which one of the two indices $n_o$ or $n_e$ is equal or substantially equal to $n_p$. When an unpolarized beam is incident on such an interface, the beam component which does not detect any difference in refractive index at the interface between isotropic and anisotropic material will be passed unrefracted, whereas the other beam component will be refracted.

If $n_p$ is equal or substantially equal to $n_o$, then the ordinary beam is passed unrefracted by an interface between isotropic and anisotropic material; if $n_p$ is equal or substantially equal to $n_e$, then such an interface passes the extraordinary beam unrefracted.

A preferred embodiment of the illumination system according to the invention is characterized in that a reflector is present on a surface located opposite the exit surface of the optical waveguide.

Light rays which are incident on the waveguide-air interface at an angle which is smaller than the critical angle are coupled out, irrespective of their direction of polarization. To reduce the loss of light output due to this phenomenon on the surface located opposite the exit surface, a reflector may be provided on this surface. In this way, a considerably higher light output of the illumination system is obtained.

The way in which use is made of the polarization separation at the interfaces depends on the implementation of the recesses in the optical waveguide.

A first embodiment of the illumination system according to the invention is characterized in that the recesses are provided in an optical waveguide surface located opposite the exit surface.

In this embodiment, the component which is passed unrefracted by the interface between isotropic and anisotropic material will reach the surface located opposite the exit surface. Dependent on the angle of incidence on this surface, the relevant component will be reflected towards the exit surface, or leave the optical waveguide via the surface located opposite thereto. In the latter case, the light reaches the reflector which is situated on the surface opposite the exit surface, so that the light will be reflected in the waveguide. Another possibility for coupling the light out of the waveguide is to provide the surface of the optical waveguide located opposite the exit surface with a diffuser, so that the largest part of the beam component with the desired direction of polarization is diffused towards the exit surface of the optical waveguide.

A further embodiment of the illumination system according to the invention is characterized in that the reflector is a polarization-maintaining reflector.

If the recesses are provided in the waveguide surface located opposite the exit surface, the reflector present on this surface should maintain the polarization, because the largest part of the light leaving the optical waveguide at this point has the desired direction of polarization, which must be maintained when this light is passed into the optical waveguide again.

A second embodiment of the illumination system according to the invention is characterized in that the recesses are provided in the exit surface.

In this embodiment, the light having the desired direction of polarization is directly coupled out at the exit surface. The light having the unwanted direction of polarization traverses once again the optical waveguide and consequently depolarizes, so that it can finally be coupled out at the exit surface, at least in so far as it has the desired direction of polarization.

Both in the first and the second embodiment described above, the beam which has remained in the optical waveguide will depolarize after some time during propagation through the optical waveguide, because the material of the optical waveguide will not be perfectly isotropic in practice. Consequently, the light beam will comprise both directions of polarization after a given propagation distance. If this light is again presented to the interfaces between isotropic and anisotropic material, there will be polarization separation again. This process is repeated every time, so that a relatively large part of the light emitted by the light source is converted into light having the same, i.e. desired direction of polarization before it is coupled out at the exit surface of the waveguide. A relatively high light output will be realized in this way. The optical waveguide may have, but does not have to have the shape of a wedge in order to couple out light from the waveguide. Consequently, a greater freedom of design is realized and, in principle, thinner waveguides may be used. Since it may be desirable that the isotropic material of the optical waveguide is also anisotropic to a limited extent, in order that depolarization occurs during propagation of the unwanted direction of polarization through the optical waveguide, a wider choice of material is possible.

Said embodiments of the illumination system according to the invention may be further characterized in that the reflector is a diffuse reflector.

Since the reflector is diffuse, the light leaving the optical waveguide is diffused through a larger angle, so that the viewing angle is increased.

A further embodiment of the illumination system according to the invention is characterized in that a reflector having a depolarizing effect is arranged on at least one end face remote from the light source.

It is known per se to provide the optical waveguide of flat illumination systems with a reflector at the end faces where no light is coupled in, so as to prevent that light arriving there is lost and thus does not contribute to the light output of the illumination system. The reflector sends the light into the optical waveguide again. In this way, this light is given a new chance of being coupled out as yet on the exit surface.

If the reflectors at the end faces have a depolarizing effect, the light incident thereon, which has a direction of polarization which is undesirable for coupling out at the exit surface, is depolarized, so that approximately half of this light immediately acquires the suitable direction of polarization and can be coupled out of the optical waveguide. The other half may depolarize again during propagation through the waveguide. The advantage of the depolarizing reflector is that, independent of the birefringence of the material of the waveguide, there will be depolarization of the unwanted beam component.

A further embodiment of the illumination system according to the invention is characterized in that the diffusing means are constituted by a diffuser which substantially maintains the polarization.

In order that the intensity of the light supplied by the illumination system is homogeneously distributed on the surface of the optical waveguide, despite the presence of discrete polarizing areas in the waveguide, the illumination system may be provided with a diffuser. Since the diffuser maintains the direction of polarization, the direction of polarization, which is selected from the light of the light source by the combination of the material of the waveguide and the material in the recesses, will not be influenced.

A further embodiment of the illumination system according to the invention is characterized in that the polarization-maintaining diffuser is constituted by diffusing centers of the same type of material as that with which the recesses are filled up.

In this way, the diffuser is integrated in the optical waveguide, and the intensity of the polarized light leaving the optical waveguide is homogeneously distributed on the surface of the waveguide without the direction of polarization of the exiting light being influenced.

A further embodiment of the illumination system according to the invention is characterized in that the diffusing centers coincide with the recesses provided in the optical waveguide which are filled up with anisotropic material.

In this case, the recesses have the functions of both polarizer and diffuser. This considerably simplifies the manufacture of the optical waveguide.

A further embodiment of the illumination system according to the invention is characterized in that the interfaces between isotropic and anisotropic material are implemented as a polarization-maintaining diffuser.

By implementing the interfaces as a diffuser maintaining the polarization, the light is diffused through an angular area determined by the structure of the interface, when the light leaves the filled recesses.

A further embodiment of the illumination system according to the invention is characterized in that the optical waveguide is formed from an optically isotropic material having refractive index $n_p$, and in that the recesses comprise an anisotropic uniaxial material having refractive indices $n_o$ and $n_e$.

This choice provides the greatest freedom of design of the optical waveguide, because the light having the desired direction of polarization then does not need to propagate through a birefringent material before it reaches the exit surface. However, in practice, isotropic material is not perfectly isotropic, but depolarization does not occur until after a long propagation distance.

A further embodiment of the illumination system according to the invention is characterized in that $n_p$ is equal or substantially equal to $n_o$.

For the conventional polymers, $n_e$ is relatively high and said choice can be more easily realized than where $n_p$ is equal or substantially equal to $n_e$.

A further embodiment of the illumination system according to the invention is characterized in that the optically anisotropic material is an anisotropic polymer gel or an anisotropic polymer network.

These materials are particularly suitable for use as a birefringent material in small quantities for filing up the recesses.

A further embodiment of the illumination system according to the invention is characterized in that the recesses have a triangular cross-section in a plane perpendicular to the plane of the waveguide.

Due to the choice of the shape of the recesses, the angle at which the refracted polarization component leaves the interface between isotropic and anisotropic material can be determined.

By means of, for example, recesses having a triangular cross-section, the angle through which the light must be coupled out of the optical waveguide, and hence the viewing angle upon use in a picture display device, can be influenced.

Another embodiment of the illumination system according to the invention is characterized in that the recesses are grooves in which fibers of an anisotropic material extend.

This embodiment of the illumination system has the advantage that it can be manufactured relatively quickly and easily.

These and other aspects of the invention will be apparent from and elucidated with reference to the embodiments described hereinafter.

DETAILED DESCRIPTION OF THE PREFERRED EMBODIMENTS

Figure 1:
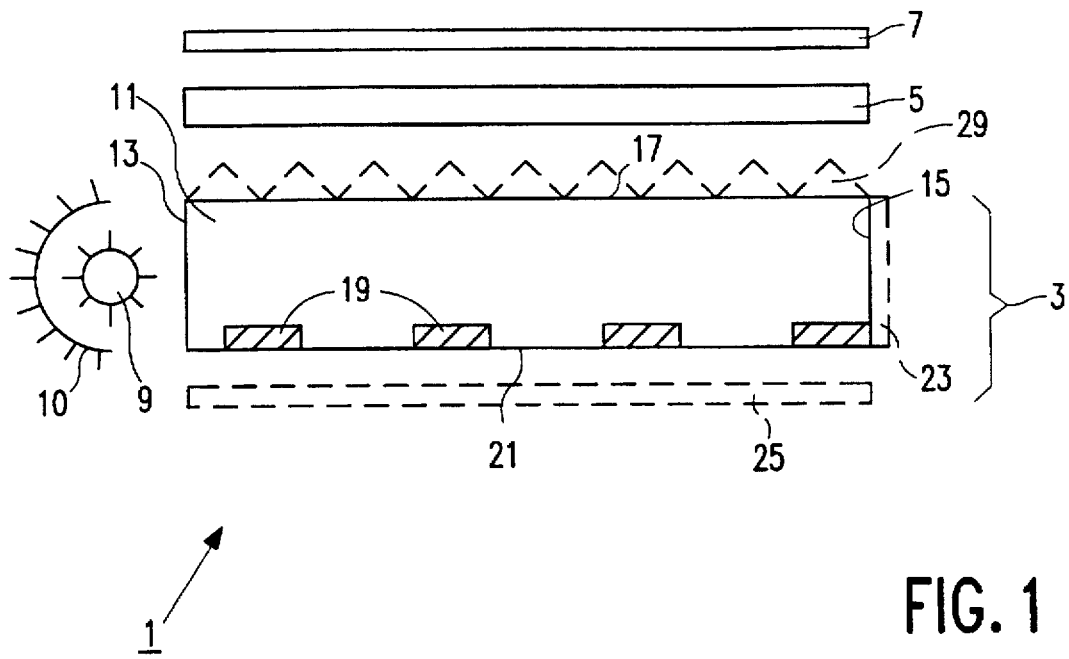
FIG. 1 shows an embodiment of a flat-panel picture display device with an illumination system according to the invention.

The picture display device 1 diagrammatically shown in FIG. 1 comprises, in this order, an illumination system 3, a picture display panel 5 and an analyzer 7. The illumination system 3 comprises an optical waveguide 11 which consists of an optically transparent material and has four end faces 13, 14, 15, 16. A light source 9 whose light is coupled into the waveguide 11 via the end face 13 is present opposite one of the end faces, for example, 13. The light source 9 may be, for example, a rod-shaped fluorescence lamp. The light source may alternatively be constituted, for example, by one or more light-emitting diodes (LED), notably in flat-panel picture display devices with small picture display panels as in, for example, a cellular telephone.

A reflector 10 is present at the side of the light source 9 facing away from the optical waveguide 11. This reflector 10 ensures that light emitted by the light source 9 in a direction remote from the optical waveguide 11 is as yet reflected towards the waveguide. The exit surface 17 of the waveguide 11 is directed towards the picture display panel 5.

In order that the illumination system 3 supplies polarized light, the optical waveguide 11 is provided with recesses 19 in which material which is different from that of the optical waveguide 11 is provided, while one of these materials is isotropic and the other is anisotropic. Polarization separation occurs on the interfaces between the isotropic and the anisotropic material. The recesses 19 may be provided in a surface of the optical waveguide, which surface may be either the exit surface 17 or the opposite surface 21. The recesses 19 may alternatively be present in the center of the optical waveguide. In the embodiment shown in FIG. 1, the recesses 19 are provided in the surface 21. FIGS. 2 to 6 show further embodiments of the illumination system and FIGS. 2 and 4 also illustrate the radiation in the optical waveguide.

The light having the desired direction of polarization, supplied by the illumination system 3, is subsequently modulated in its direction of polarization by the picture display panel 5 in conformity with the picture information to be displayed. Subsequently, the modulated light is incident on the analyzer 7 which blocks the light coming from those pixels on the picture display panel which must appear as dark pixels in the final picture. The analyzer 7 may be, for example, an absorbing polarizer which absorbs the unwanted direction of polarization, but also a reflecting or refracting polarizer which removes a direction of polarization, which is undesirable for the picture, from the light path.

The picture display panel 5 may be, for example, a liquid crystalline material in which a matrix of pixels is arranged and whose operation is based on the twisted nematic effect (TN), the supertwisted nematic effect (STN), or the ferroelectric effect so as to modulate the direction of polarization of light incident thereon.

There are different possibilities of realizing the invention. If the material of the optical waveguide is isotropic, the material in the recesses should be anisotropic. On the other hand, the optical waveguide may consist of anisotropic material, whereas the recesses are filled up with isotropic material. The embodiment in which the optical waveguide is isotropic to a large extent and in which the recesses are filled up with anisotropic material is preferred, because in this case the light having the desired direction of polarization does not need to propagate through a birefringent material, thus providing a greater freedom of design of the optical waveguide because a longer distance can be covered before depolarization occurs.

A suitable isotropic material for the optical waveguide 11 is, for example, PMMA or polycarbonate. A pattern of recesses 19 is subsequently provided in the optical waveguide 11, for example, by means of milling, etching or pressing in a hot die. The recesses 19 may be grooves which extend perpendicularly or at an angle to the direction of propagation of the light in the optical waveguide 11. The recesses 19 may alternatively be pits in the surface of the waveguide 11, with a rectangular, square or triangular cross-section in the plane of the drawing. The recesses are subsequently filled up with an anisotropic uniaxial material, for example, liquid crystalline material. Dependent on the liquid crystalline material used, the transparent plate with the filled recesses should be shielded or not shielded with a rubbed layer so as to obtain the desired ordering within the liquid crystalline material. Subsequently, the liquid crystalline layer is cured by means of UV light. Suitable liquid crystalline materials are, for example, anisotropic polymer gels as described, for example, in EP 0 451 905 which corresponds to U.S. Pat. No. 5,188,760 or anisotropic polymer networks as described, for example, in EP 0 213 680 which corresponds to U.S. Pat. No. 4,733,941.

If the optical waveguide 11 is implemented in an anisotropic material, a unidirectional PMMA and polycarbonate are suitable as materials. The recesses provided in the optical waveguide can then be filled up with isotropic material such as, for example, isotropic PMMA or an UV-cured isotropic acrylate.

Each end face 15 of the transparent plate, in which light is not coupled in, can be provided with a reflector 23. In this way, it is prevented that light which is not coupled out at the exit surface 17 and consequently propagates through the optical waveguide and reaches an end face, leaves the optical waveguide 11 via this end face 15. In fact, the reflector 23 reflects the light back into the optical waveguide 11. This reflector 23 is preferably a depolarizing reflector. Since isotropic material is not perfectly isotropic in practice, there will be depolarizing upon propagation through this material. However, at a small anisotropy, this only occurs after a long propagation distance. By implementing the reflectors 23 as depolarizing reflectors, this effect will be stronger, which is very advantageous if the material of the optical waveguide has a small depolarizing effect, which is desirable for the passage of the desired polarization component. Moreover, the freedom of design is guaranteed.

Also the surface 21 located opposite the exit surface 17 may be provided with a reflector 25 so as to prevent light having the desired direction of polarization from exiting at this surface 21 without contributing to the light output of the illumination system. This reflector 25 should maintain the polarization. Moreover, this reflector 25 is preferably diffuse. In this way, the light incident thereon is spread through a larger angle and the viewing angle can be increased.

The light output of the illumination system can thus be increased considerably by the reflectors 23, 25.

The reflectors 23, 25 may be implemented, for example, as a vapour-deposited thin film, or as a foil. In the Figures, they are shown in broken lines because they are optional.

If the illumination system is used in a picture display device in which a very high contrast is desired, an extra polarizer may be arranged at the side of the illumination system facing the picture display panel so as to enhance the direction of polarization of the light supplied by the illumination system before this light reaches the picture display panel. If this polarizer is a reflecting polarizer, there will be substantially no loss of light, because the light reflected thereby reaches the optical waveguide again in which it can be converted into light having the desired direction of polarization.

Figure 2:
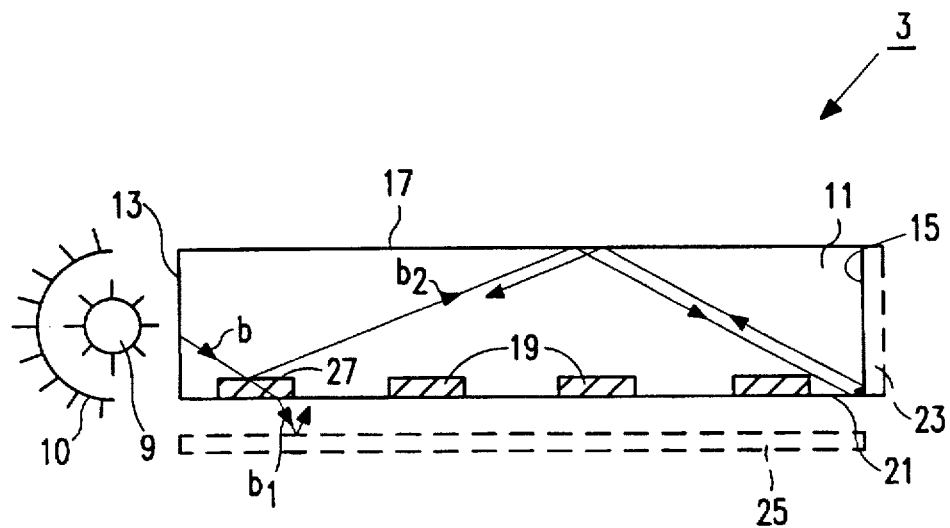
FIG. 2 is a cross-section of an embodiment of an illumination system according to the invention, in which the beam path is also illustrated.

FIG. 2 shows an embodiment of the illumination system according to the invention, as already shown in FIG. 1, in which the beam path is illustrated and in which the optical waveguide is isotropic and the recesses are filled up with anisotropic material.

The separation of polarization is effected at the interfaces 27 between the isotropic and the anisotropic material. When an unpolarized light beam b is incident on such an interface 27, this beam will be separated into two beam components $b_1$, $b_2$ having mutually perpendicular directions of polarization. In order that polarization separation takes place, it should hold for the isotropic material with refractive index $n_p$ and for the anisotropic material with refractive indices $n_o$ and $n_e$ that one of the indices $n_o$ or $n_e$ is equal or substantially equal to $n_p$. The beam component $b_1$ propagates to the surface 21 and will be reflected upon incidence at an angle which is larger than the critical angle for total internal reflection. At an angle of incidence which is smaller than this critical angle, the component will leave the optical waveguide 11. Another possibility of sending light having the desired direction of polarization to the exit surface is to provide the surface 21 with a diffuser which maintains the polarization. This diffuser will mainly diffuse the light incident thereon towards the exit surface, while the remaining part will leave the optical waveguide at the surface 21.

To prevent light having the desired direction of polarization from leaving the optical waveguide 11 without contributing to the light output of the illumination system, a reflector 25 may be arranged on the surface 21 so that the light which has left the optical waveguide is sent into the waveguide 11 again and to the exit surface 17. The reflector 25 may be a separate component but will often be arranged in direct contact with the optical waveguide 11 so as to minimize the reflection losses.

The unwanted beam component $b_2$ is reflected on the interfaces 27, will propagate through the optical waveguide 11 and simultaneously depolarize. This beam component will finally reach an interface 27 and will subsequently be polarized, as already described hereinbefore. Another possibility is that this component or a part thereof reaches the end face 15 where it is depolarized, so that the part having the desired direction of polarization will be selected when it reaches an interface 27.

If, for example, $n_o=n_p$, then the light coupled out of the optical waveguide 11, will have its direction of polarization in the plane of the direction of propagation of the light and the optical axis of the anisotropic material. The light is maximally coupled out if the direction of polarization is parallel to the optical axis. This means that the optical axis is preferably parallel to the longitudinal direction of the rod-shaped lamp 9.

In practice, $n_e=n_p$ is relatively difficult to realize because $n_e$ is much higher than $n_p$ for the conventional polymers.

FIGS. 3, 4, 5 and 6 show several embodiments of an illumination system according to the invention.

Figure 3:
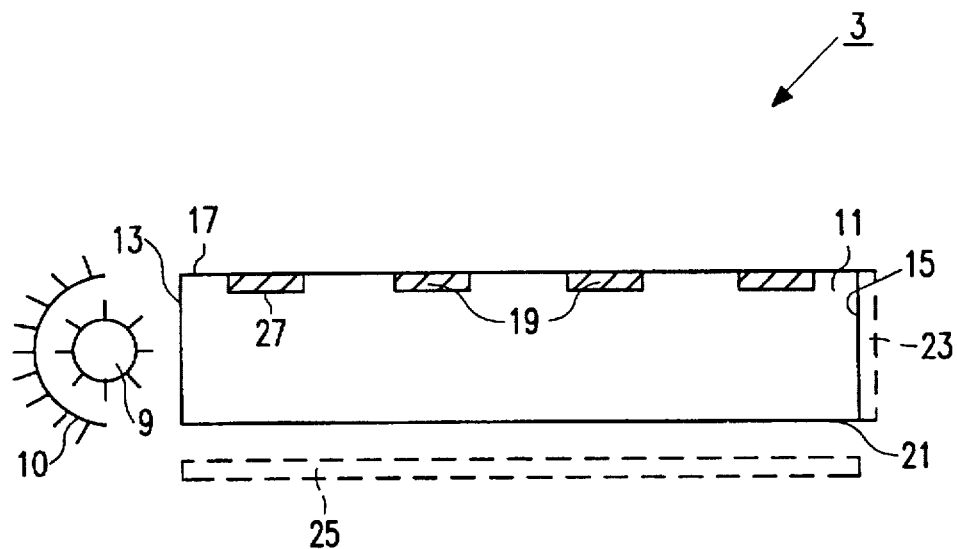
FIGS. 3, 4, 5 and 6 are cross-sections of a number of embodiments of an illumination system according to the invention.

In FIG. 3, the recesses 19 are provided in the exit surface 17. When, in this embodiment, an unpolarized beam is incident on an interface 27, the desired beam component will be passed by the interface 27 towards the exit surface 17 where it will be coupled out of the optical waveguide 11 at an angle with respect to the normal on this surface. The unwanted beam component is reflected in the optical waveguide 11 at the interface 27. After depolarizing at the end face 15 or after depolarization during propagation and after one or more internal reflections on the waveguide-air surfaces 17, 21, this beam component will reach an interface 27 where the component having the desired direction of polarization is selected and is coupled out at the exit surface 17. Also in this case, a reflector 25 may be arranged on the surface 21. However, the reflector 25 does not need to maintain the polarization in this case, but is preferably depolarizing because the greater part of the light leaving the optical waveguide at this surface 21 has the unwanted direction of polarization. In this way, already approximately half the light sent again into the optical waveguide 11 by the reflector 25 has the desired direction of polarization.

Figure 4:
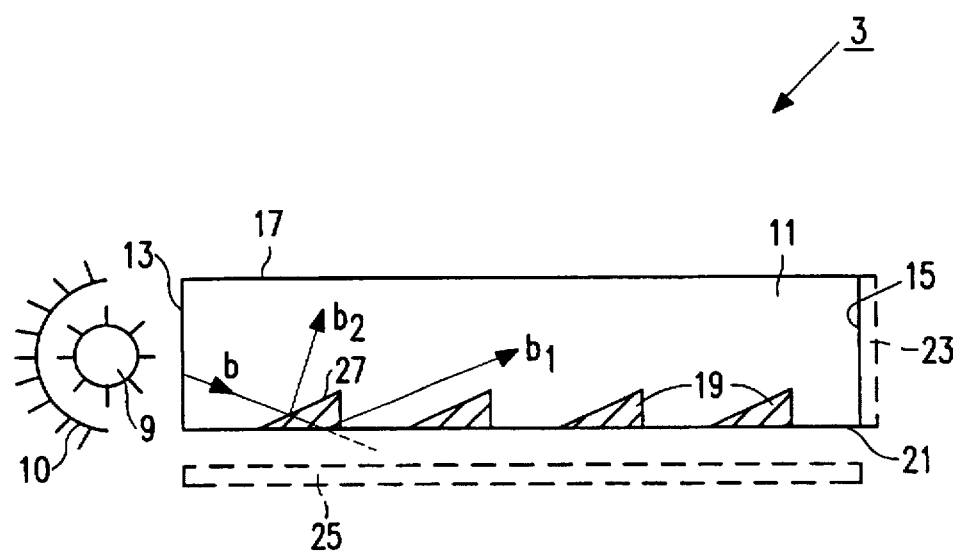

In FIG. 4, the recesses 19 are provided in the surface 21 and have a triangular cross-section. By varying the slope of the interfaces 27, the direction of the light coupled out of the waveguide 11 can be influenced. In this way, the viewing angle of the picture display device, in which the illumination system is used, can be determined. Here again, the recesses may be present in the exit surface 17.

Figure 5:
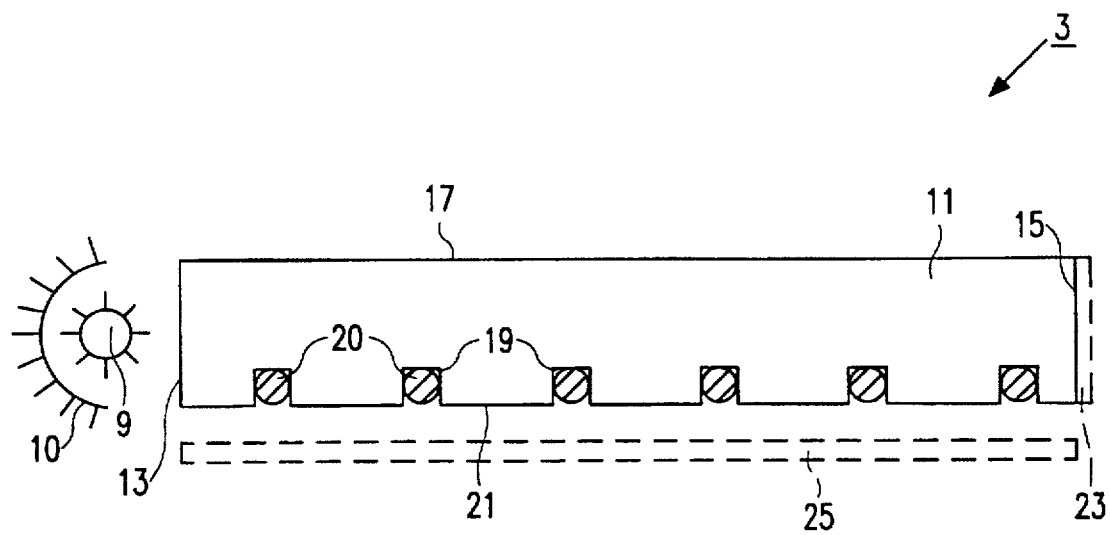

In FIG. 5, the recesses 19 are provided as grooves transversely to the direction of propagation of the light. Fibers 20 of an isotropic or anisotropic material, dependent on the nature of the material of the optical waveguide 11, extend in the grooves. The fibers 20 may be fixed, for example, in the grooves by means of glue having the same refractive index as the isotropic material. In this case, the interfaces are constituted by the circumference of the fibers. In the Figure, the grooves are provided in the surface 21, but it is also possible to provide the exit surface 17 with such grooves and fibers.

Figure 6:
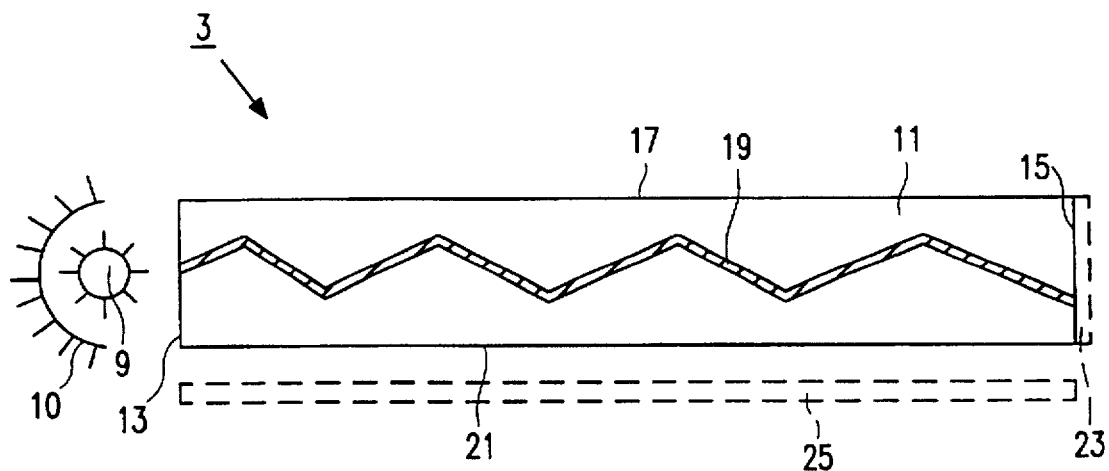
Figure 7A:
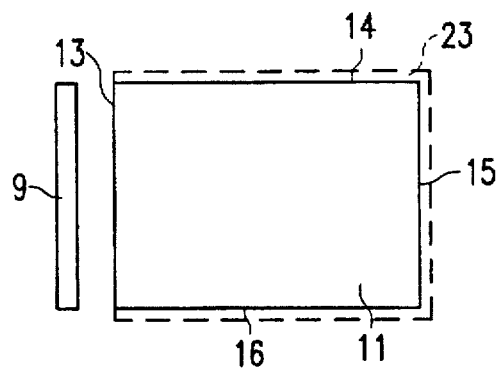
FIGS. 7a to 7d show a number of embodiments of illumination systems with different configurations of the light source.
Figure 7B:
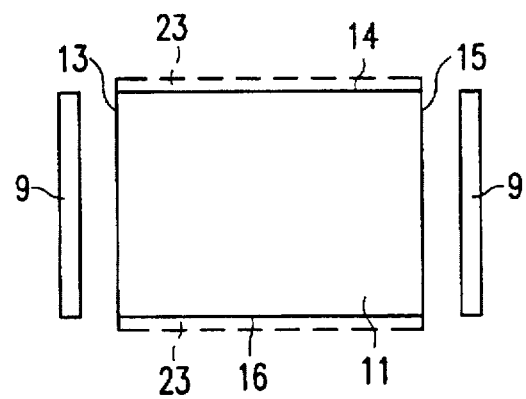
Figure 7C:
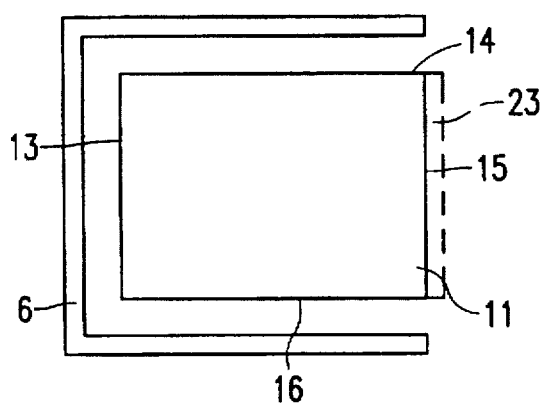
Figure 7D:
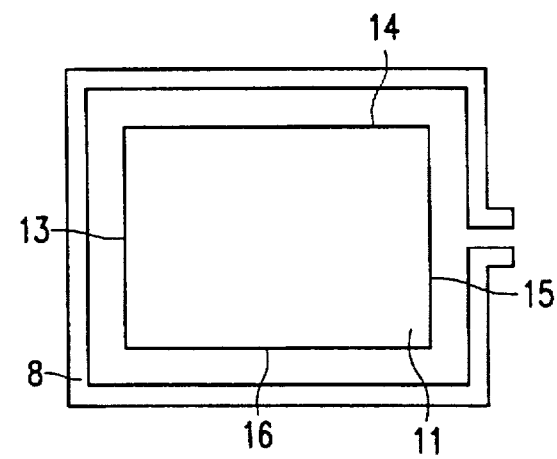

In FIG. 6, the recesses 19 are provided in the center of the optical waveguide 11. Here again, the recesses may have different shapes. In this case, the recesses constitute an interspace between two optical waveguide portions having a complementary profile, for example, a triangular profile. The interspace is then filled up with anisotropic or isotropic material, dependent on whether the material of the optical waveguide portions is isotropic or anisotropic.

Instead of providing a fluorescence lamp 9 at only one end face 13, a rod-shaped lamp 9 may also be provided at the opposite end face 15 so as to achieve a greater brightness. It is also possible to provide a rod-shaped lamp 9 on a third end face 14 and possibly on a fourth end face 16. Instead of one separate rod-shaped lamp per end face, for example, a single rod-shaped lamp 6, 8 having a number of bends may be used for illuminating three or four end faces. This enhances the efficiency of the illumination system, because the losses in such a lamp decrease with an increasing length. All the above-mentioned possibilities are illustrated in FIGS. 7a to 7d, which show a number of illumination systems in plan views with different light source configurations.

If light is coupled in at only one end face (FIG. 7a), or if light is coupled in at two parallel end faces (FIG. 7b), the optical axis of the anisotropic material is preferably parallel to the longitudinal direction of the rod-shaped lamp. If the rod-shaped lamps are not parallel, but enclose an angle (FIGS. 7c, 7d), the optical axis of the anisotropic areas preferably encloses such an angle with the plane of the incident light that the direction of polarization will be at an angle to the axis of the rod-shaped lamp. In practice, the rod-shaped lamps are usually located perpendicularly with respect to each other, and the optical axis is preferably oriented at an angle of substantially 45° with respect to the rod-shaped lamps. If the recesses are grooves, this can be realized, for example, by orienting the grooves at an angle of | 45° | with respect to each rod-shaped lamp.

To homogenize the intensity distribution on the exit surface of the optical waveguide, flat illumination systems generally comprise a diffuser. The drawback of using such a diffuser in an illumination system according to the invention is that the optical waveguide itself supplies polarized light. If the diffuser acts on the light supplied by the optical waveguide, this light will be depolarized thereby, which is not the intention.

In the illumination system described in the above-mentioned United States patent, no diffuser is used and the intensity distribution on the surface remains relatively inhomogeneous. In other known flat-panel picture display devices, the diffuser is present in front of the polarizer which selects a direction of polarization from the light supplied by the diffuser.

The illumination system according to the invention has the advantage that the diffusing function can be taken up in the anisotropic material. In this way, the intensity distribution is considerably more homogeneous than in the optical waveguide described in the United States patent, and both the polarization and the diffusion is performed by means of the anisotropic material without extra components being required. Moreover, the pattern of recesses provided in the optical waveguide is rendered invisible in the picture in this way. Thus, a flat-panel picture display device in which an illumination system according to the invention is used may be very flat. Moreover, the homogeneity is not at the expense of the output of polarized light.

To act as a diffuser maintaining the polarization, the diffusing centers of the diffuser should be implemented in anisotropic material. The optical axis should be located in the plane of the direction of polarization and the direction of propagation of the light, while $n_o=n_p$ should hold for the anisotropic material. The diffusion centers may be provided as separate areas or as a separate layer of diffusing particles in the optical waveguide 11. However, since they should satisfy the above-mentioned characteristics, they may coincide with the anisotropic material which ensures polarization in the optical waveguide. Another possibility is to implement the interface between the isotropic and the anisotropic material as a polarization-maintaining diffuser or to provide it with a diffusing layer. In all these cases, the diffuser is integrated in the optical waveguide 11 and the direction of polarization generated by the illumination system is not influenced by the diffuser. In the embodiment in which the diffusing centers coincide with the recesses with anisotropic material and in the embodiment in which the interface between the isotropic and the anisotropic material has a diffusing function, the manufacture of the optical waveguide 11 of the illumination system is considerably simplified.

Moreover, the illumination system 3 may be provided with an element 29 concentrating the radiation to a beam, as is shown by way of a broken line in FIG. 1. This element 29 may be implemented, for example, as a one-dimensional or two-dimensional prism structure. The light exiting from the illumination system can then be concentrated to a beam within an angle which is smaller than the angle within which the light leaves the optical waveguide, resulting in an increase of the brightness in a given angular area. The angular area in which the light is concentrated to a beam is determined by the angles of inclination of the prism edges and by the material of the element 29. The use of such a radiation-concentrating element in flat-panel picture display devices is known, for example, from the English language abstract of JP-A 2-257188. The element may consist of isotropic material or anisotropic material. If anisotropic material is used, the optical axis of the material should be parallel to the direction of polarization supplied by the illumination system in order that the direction of polarization of the light supplied by the illumination system is maintained.

We claim:

1. An illumination system comprising an optical waveguide of an optically transparent material having an exit surface and a plurality of end faces, opposite at least one of which a light source is situated, whose light can be coupled in at said end face of the optical waveguide, and polarizing means for polarizing the light emitted by the light source, characterized in that the optical waveguide has a plurality of recesses comprising a material which is different from that of the optical waveguide, and in that the polarizing means are constituted by interfaces between the recesses and the optical waveguide, while the material of the optical waveguide or the material in the recesses is optically anisotropic and the other material is isotropic.

2. An illumination system as claimed in claim 1, characterized in that a reflector is present on a surface located opposite the exit surface of the optical waveguide.

3. An illumination system as claimed in claim 2, characterized in that the reflector is a diffuse reflector.

4. An illumination system as claimed in claim 1, characterized in that the recesses are provided in an optical waveguide surface located opposite the exit surface.

5. An illumination system as claimed in claim 4, characterized in that the reflector is a polarization-maintaining reflector.

6. An illumination system as claimed in any one of claims 1, 2, 4, and 5, characterized in that a reflector having a depolarizing effect is arranged on at least one end face remote from a light source.

7. An illumination system as claimed in claim 1, characterized in that the recesses are provided in the exit surface.

8. An illumination system as claimed in claim 1, which illumination system comprises diffusing means for homogeneously distributing the intensity of the light supplied by the illumination system, characterized in that the diffusing means are constituted by a diffuser which substantially maintains the polarization.

9. An illumination system as claimed in claim 8, characterized in that the polarization-maintaining diffuser is constituted by diffusing centers of the same type of material as that with which the recesses are filled up.

10. An illumination system as claimed in claim 9, characterized in that the diffusing centers coincide with the recesses provided in the optical waveguide which are filled up with anisotropic material.

11. An illumination system as claimed in claim 8, characterized in that the interfaces between isotropic and anisotropic material are implemented as a polarization-maintaining diffuser.

12. An illumination system as claimed in claim 1, characterized in that the optical waveguide is formed from an optically isotropic material having refractive index $n_p$, and in that the recesses comprise an anisotropic uniaxial material having refractive indices $n_o$ and $n_e$.

13. An illumination system as claimed in claim 12, characterized in that $n_p$ is equal or substantially equal to $n_o$.

14. An illumination system as claimed in claim 12, characterized in that the optically anisotropic material is an anisotropic polymer gel or an anisotropic polymer network.

15. An illumination system as claimed in claim 1, characterized in that the recesses have a triangular cross-section in a plane perpendicular to the plane of the waveguide.

16. An illumination system as claimed in claim 1, characterized in that the recesses are grooves in which fibers of an anisotropic material extend.

17. A flat-panel picture display device including an illumination system provided with a picture display panel for modulating the direction of polarization of light emitted by the illumination system in conformity with picture information to be displayed, and an analyzer, characterized in that the illumination system is implemented as claimed in claim 1.

* * * * *